United States Patent [19]
Sheppard

[11] 3,826,153
[45] July 30, 1974

[54] BALL-SCREW MECHANISM

[76] Inventor: Richard H. Sheppard, c/o R. H. Sheppard Co., Inc., Hanover, Pa., 17331

[22] Filed: Sept. 6, 1972

[21] Appl. No.: 286,695

[52] U.S. Cl. ............................................. 74/459
[51] Int. Cl. .......................................... F16h 55/04
[58] Field of Search ..................................... 74/459

[56] References Cited
UNITED STATES PATENTS

| | | | |
|---|---|---|---|
| 2,842,978 | 7/1958 | Orner | 74/459 |
| 2,924,113 | 2/1960 | Orner | 74/459 |
| 3,156,133 | 11/1964 | Anthony | 74/459 |
| 3,176,535 | 4/1965 | Rowland | 74/459 |
| 3,198,029 | 8/1965 | Orner | 74/459 |

*Primary Examiner*—Leonard H. Gerin
*Attorney, Agent, or Firm*—Lowe, King & Price

[57] ABSTRACT

An easily machined ball-screw mechanism of compact design and characterized by improved smoothness of operation is disclosed. In the mechanism, a tubular nut is encased by an outer removable enclosing member and is operatively engaged with a screw member having a helical groove. The tubular nut has two helical guideways, one on the inner circumferential surface, in opposed relationship with said helical groove, and one in the return direction on the outer circumferential surface. A first set of bearing members is held captive between the inner helical guideway of the nut and the groove, and a second set is held captive in the outer guideway of said tubular nut by the enclosing member. Separate transfer discs positioned at each end of the tubular nut have an open grooved ramp spiraling from cooperative adjacency with the inner guideway to the outer guideway to transfer bearing members between said first and second sets. A sleeve adapted to mate with the enclosing member and the nut assist in loading the bearing members.

10 Claims, 7 Drawing Figures

PATENTED JUL 30 1974 3,826,153

BALL-SCREW MECHANISM

The present invention relates to a ball-screw mechanism, and, more particularly, to an improved ball-screw mechanism which is easily machined and of compact design.

BACKGROUND OF THE INVENTION

With hitherto known ball-screw mechanisms, the ball return means usually consists of some form of tubular ball catching member which conveys the ball from one end of the ball race back to the other end. The tubes are located externally and are bolted onto the mechanism with clips and screws. This external hardware is, obviously, quite susceptible to damage from a variety of sources and is relatively expensive to fabricate. The extra hardware required to support the tube also defeats any compactness which may be required, such as in integral power steering gears.

The external return tube also creates further problems due to the possibility of damaging a transfer ramp required to move the balls from the race into the tube. Usually, this ramp is made of thin, sheet metal integral with the return tube and is therefore susceptible to deformation. Even if this ramp is not deformed to the extent so as to stop the flow of balls, slight deformation detracts from the overall smoothness, and thus efficiency, of operation of the mechanism.

A further problem with tubular ball catchers is the abruptness with which the direction of the balls is changed. The abrupt change in direction increases the possibility of damage to the balls themselves as well as to the race. The reliability and longevity of these mechanisms is penalized due to the wear of the parts caused by an abrupt change in direction.

The present invention overcomes these problems by utilizing unique machined parts including end discs to transfer the balls into the return race. The discs have open grooves which are easily machined. Since only open grooves are exposed to the bearings, the discs are nearly insusceptible to damage from the bearings or outside forces.

The parts of the present invention are more economic to machine while maintaining the close tolerances required. Because all the machined parts of the present invention interfit with each other and are held by a single threaded locking member, there are no additional clips and bolts required and this ease of assembly is a further advantage of the present invention.

By eliminating the need for external parts, the present ball-screw mechanism provides a compact design. Such a compact design makes the present invention ideal for use in steering gear valves as well as any other application where compactness and smooth operation must be combined with reliability.

This invention, therefore, broadly concerns a compact ball-screw mechanism capable of smooth, reliable operation under a wide range of conditions.

OBJECTIVES OF THE INVENTION

As can be seen from the foregoing and as will become still more apparent in the following descriptive material, a broad objective of the present invention is to provide a ball-screw mechanism of compact design.

A further objective is to provide a ball-screw mechanism having no external parts which may become damaged.

Still another objective of the present invention is to provide a ball-screw mechanism capable of smooth operation.

Still another objective of the present invention is to provide a mechanism having novel end discs which will smoothly change the direction of the bearing members.

Still another objective of the present invention is to provide an easily machined ball-screw mechanism which is capable of easy assembly.

SUMMARY OF THE INVENTION

The present invention thus provides a compact ball-screw mechanism with all machined parts capable of compact assembly and smooth operation. A tubular nut having simple helical inner and outer circumferential machined surface is encased between an outer removable enclosing member surrounding said nut and a screw member having a helical groove. The tubular nut has two helical guideways, one on the inner circumferential surface in opposed relationship with said helical groove, and one in the return direction on the outer circumferential surface. The enclosing member may be the spool member of a fluid valve although any other member that is desired to be moved along a screw is appropriate.

Smooth operation of the mechanism is provided by two sets of balls or bearing members. A first set is held captive in the inner helical guideway of the nut by said helical groove and a second set is held captive in the outer return helical guideway of said tubular nut by said enclosing member.

The outer return helical guideway may be of the same pitch as the first inner helical guideway and of substantially the same depth as the cross section dimension of said bearing members. Thus, the outer return helical guideway enhances the smooth operation of the present invention. The return passage has been made shorter by a more direct route in prior art devices, but the cost of extra balls required is negligible compared to the improved operation. The outer helical guideway being of substantially the same depth as the cross section dimension of said bearing members allows said enclosing member to be ungrooved. Easy assembly of said mechanism is provided by this feature since the loaded nut may be slid directly into the enclosing spool member after being loaded by use of the loading sleeve to be described.

The enclosing member includes a cavity in which the tubular nut and end discs are mounted. A locking ring member is mounted at one end of said cavity and is the only part required to support and lock said nut and discs within said cavity. No part of the mechanism is external to the enclosing member and thus the danger of damage from external sources is avoided.

Separate transfer discs positioned at each end of the tubular nut have an open 360° grooved ramp spiraling from cooperative adjacency with the inner guideway to the outer guideway to transfer bearings between the first and second sets. The grooved ramp provides a smooth, trouble-free transfer. The depth of said ramp is minimum adjacent the two helical guideways and maximum in the central portion between the guideways.

The possibility of damage due to misaligned operation is prevented by providing pin means to hold the transfer discs to the tubular nut within the enclosing member. Misalignment due to relative movement of the assembly is prevented by one of the pin means which is received in a locating aperture in the bottom of the cavity in the enclosing member.

The enclosing member is also adapted to receive a loading sleeve for the bearing members. The sleeve may be inserted into the open end of the cavity when the locking ring means is removed. When the inner surface of the sleeve is mated with the outer face of said nut, an opening will align with the outer helical guideway. Bearings are therefore easily loaded into the tubular nut guideway. After the bearings are loaded into the outer helical guideway, said sleeve will hold said bearing members in place until the nut assembly is inserted into place inside the cavity of the enclosing member.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

DETAILED DESCRIPTION OF THE PREFERRED EMBODIMENT

Figure 1:
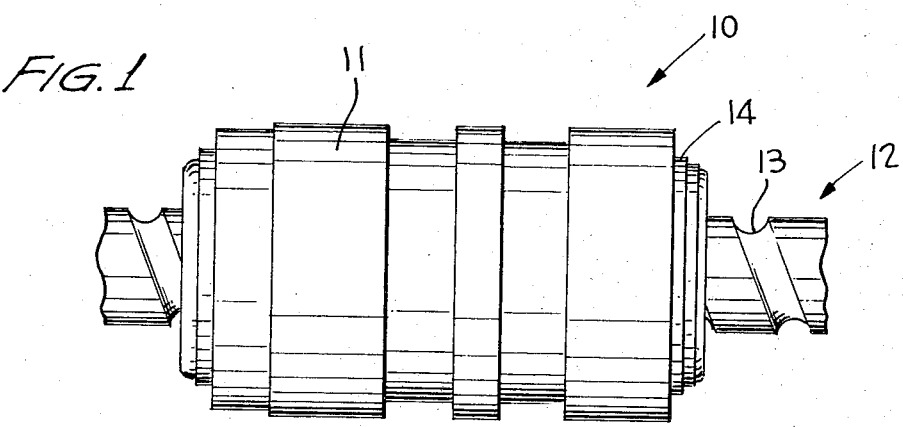
FIG. 1 is an overall side view of a ball screw mechanism constructed in accordance with the present invention.
Figure 2:
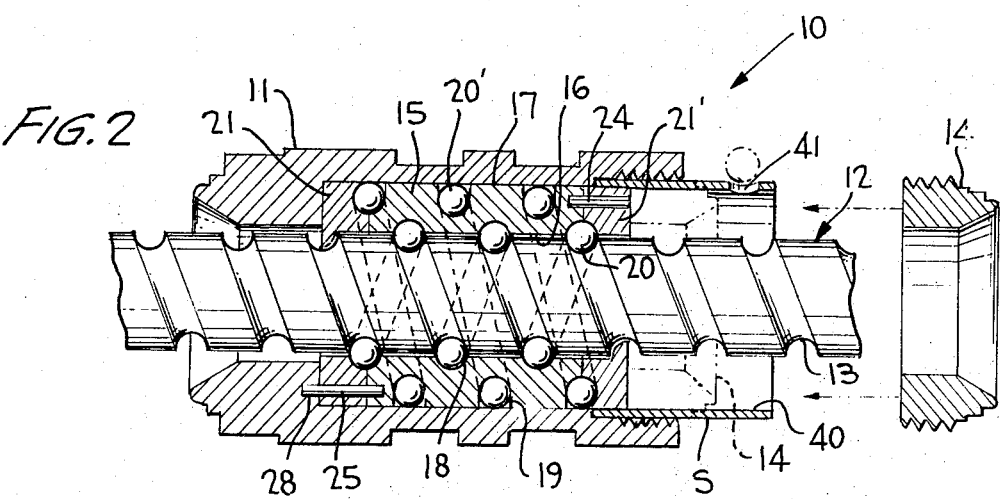
FIG. 2 is a longitudinal cross-sectional view of the mechanism shown in FIG. 1 and with the loading sleeve in operative position.

With reference to FIGS. 1 and 2, the apparatus may broadly be described as a ball-screw mechanism or asembly 10 comprising a removable enclosing member 11 which encases a screw member 12 having thereon a helical groove 13. Locking ring means 14 is positioned at one end of the enclosing member 11 to hold the internal parts of the asembly in position. The enclosing member may be in the form of a spool for use in the control valve of a power steering gear unit, for example. However, it is to be understood that the asembly 10 is adaptable for any environment where a compact, reliable screw mechanism is needed.

As shown in FIG. 2, tubular nut 15 of the assembly is positioned between the removable enclosing member 11 and screw member 12. The tubular nut 15 surrounds said screw 12 and has inner circumferential surface 16 and outer circumferential surface 17. The surface 16 has machined thereon helical guideway 18 (best shown in FIG. 3) and surface 17 has matched thereon helical guideway 19.

The helical guideway 18 is machined to be in cooperative relationship with groove 13 on screw member 12. The cooperative relationship includes pitch as well as depth. Thus as shown in FIG. 2, a first set of ball bearing members 20 is held captive between groove 13 and guideway 18 to maintain a driving relationship between the screw 12 and the nut 15. Therefore, the guideway 18 is machined to a depth which will accommodate bearing members 20 when said members 20 are positioned in helical groove 13. As seen in the embodiment shown by FIG. 2, the total clearance between guideway 18 and groove 13 is substantially equal to the diameter of members 20.

The return helical guideway 19 is machined to be in cooperative relationship with the cavity of the enclosing member 11. As shown in FIG. 2, a second set of bearing members 20' is held captive in helical guideway 19. Therefore, machining guideway 19 to be in cooperative relationship with enclosing member 11 requires machining guideway 19 to a depth sufficient to accommodate the full height of the bearing members. Thus, as shown, this depth is substantially equal to the diameter of said members 20'. An enclosing member 11 is ungrooved, the same is easily machined by a simple drilling and reaming operation. The guideway 19 is machined to guide members 20' in a direction opposite to that followed by members 20 in groove 13 and both the guideways 18, 19 and the groove 13 are single pitch although it is to be understood that double pitch thread embodiments could be used while taking advantage of the features of this invention. The guideway 19 is open grooved and is therefore amenable to easy machining.

As is also shown in FIG. 2, separate transfer discs 21 are positioned at each end of the nut 15. The discs 21 serves as the means whereby the bearing members are transferred between first set 20 and the second set 20'. The discs 21 will be discussed below in greater detail.

In the assembly, the tubular nut 15 and the end discs 21 are mounted within the cavity of the member 11, as is already apparent. The locking ring member 14 is mounted at the open end of said cavity 22 to hold the nut 15 and the discs 21 is assembled relationship within the cavity. The open end is designed to mate with a loading sleeve S when the ring member is removed (see FIG. 2). The loading sleeve S, also, will be discussed below in greater detail.

When the enclosing member 11 is removed, all of the parts of the mechanism 10 are easily disassembled and can be seen in FIG. 2. As there are no additional nuts or bolts required for any return mechanism, assembly is seen to be expeditious.

The enclosing member 11 also serves as an integral shield to protect the remainder of the mechanism 10 from damage. Enclosing member 11 may comprise any hard material, such as steel or the like. If lightweight construction is desired, a hard plastic may be used. By encasing the mechanism, and thereby protecting the bearing members from damage, a wide variety of materials may be selected for the bearing members. Materials such as nylon or plastic may be used without fear of deformation due to any impact which might be suffered during use.

The shielding provided by the enclosing member 11, by increasing reliability and longevity, enhances the desirablility of the ball-screw mechanism. By enhancing these features, the actual cost of the ball-screw mechanism is minimized, as one mechanism may be used for long periods of time. Repair costs are also seen to be reduced because of the increased reliability. The ease of assembly also tends to reduce repair costs by reducing the number of man-hours required for maintenance.

The pitch of the grooves of helical guideway 18 is substantially equal to the pitch of the grooves in guideway 19. As can be seen in FIG. 2, however, the grooves of guideways 18 and 19 are offset by approximately one half of one pitch dimension and the two guideways pass over each other with a minimum of clearance. Thus, a compact design is provided.

Figure 3:
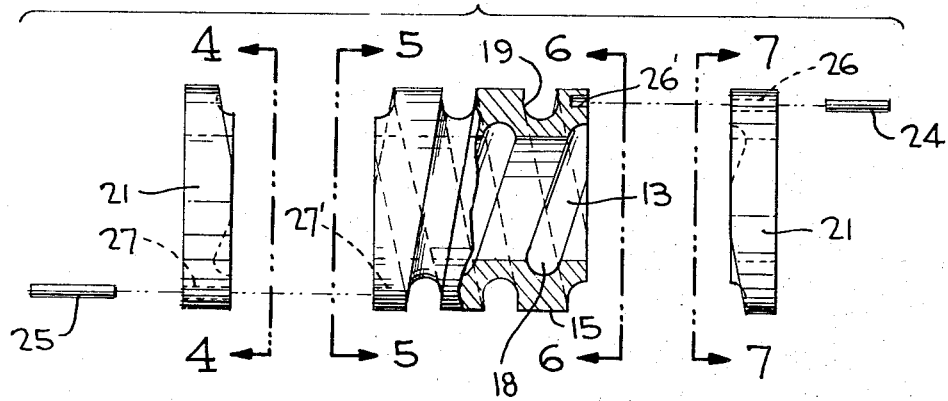
FIG. 3 is an exploded view partly in cross section showing the nut and end discs in detail.

As shown in FIG. 3, pin means 24 and 25 affix end discs 21, 21' to nut 15 to form the internal assembly. The pin means are fit through holes 26 and 27 and are held in apertures 26' and 27' by a tight friction fit (see FIG. 2). Additionally, the pin 25 is located in aperture 28 of enclosing member 11 (see FIG. 2). By means of the pin 25 movement of the assembly within cavity 22 relative to enclosing member 11 is prevented. Pin means 25 and 26 are easily inserted into the aligning holes thereby enhancing the above-discussed features of expeditious assembly.

Figure 4:
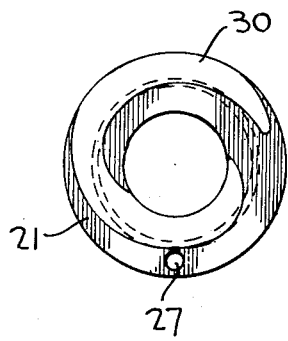
FIGS. 4–7 are views taken on lines 4—4 through 7—7 of FIG. 3, respectively, showing the end faces of the parts of FIG. 3.
Figure 7:
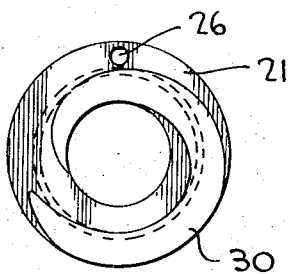

With reference to FIGS. 4 and 7, a detailed description of the end discs 21, 21' will now be presented. Each disc 21 has an open grooved ramp 30 spiraling from cooperative adjacency with the first guideway 18 to the second guideway 19 (compare FIGS. 4 and 5 and FIGS. 6 and 7). As shown in the preferred embodiment, the spiral ramp extends through 360°.

The depth of ramp 30 gradually varies from a minimum adjacent the guideway 18 to a maximum and back to a minimum adjacent the guideway 19. The depth of ramp 30 in the central portion, as shown in FIG. 4, is approximately equal to the diameter of a bearing member. As an example of the division of ramp 30, the depth of said ramp varies from a minimum to a maximum in the first 180°, then extends from a maximum back to a minimum in the last 135° with the central maximum depth portion extending through the central 45°.

By employing an open groove design for the transfer discs 21, several advantageous results are obtained. First, the open grooves are readily machined and the cost of producing ball-screw mechanisms is therefore minimized. Additionally, strength of design is provided to end discs 21 because no unsupported thin metal portions are exposed to collision with bearing members 20 or 20'.

As can be seen in FIGS. 4 and 7, bearing members 20 and 21', contact end discs 21 at ramp 30. Impact is evenly distributed over a relatively large area, thereby minimizing any strain induced in disc 21. Thus, the possibility of deformation of either disc 21 or members 20 and 20' is minimized.

Figure 5:
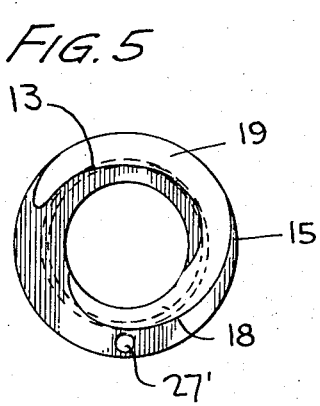
Figure 6:
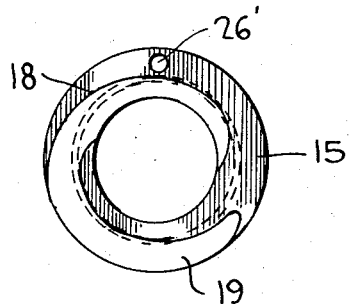

By comparing FIGS. 4 and 5, the operation of end discs 21 becomes apparent. A bearing member 20 will enter ramp 30 in the first minimum depth segment adjacent guideway 18, be lowered into the central maximum depth section within the first 180° of travel, remain at the maximum depth section for approximately 45° and then be transferred into guideway 19 after being raised back to the minimum depth of ramp 30 within the last 135° of travel. The reverse operation will be carried out at the opposite end of the nut 15 as shown in FIG. 2 whereby members 20° are transferred back one by one into helical guideway 18. It is obvious that the functions of the discs 21, 21' as just described will be reversed when the screw 12 is turned in the opposite direction.

The gradual depth change of ramp 30 provides a smooth transfer of the bearing members between guideways 18 and 19. This smoothness of transfer contributes to the overall operational smoothness of the mechanism 10. The smooth operation makes the ball-screw mechanism ideal for steering gear valves where minimum resistance of the steering is the objective. Mechanism 10, however, is, as stated earlier, not limited to such an application, and may be used in any design where compactness, reliability and smoothness of operation are advantageous.

The sleeve S is employed to load bearing members into nut 15. The sleeve S is positioned at one end of the assembly 10 in the undercut threaded opening after the ring means 14 is removed therefrom. The sleeve S has inner surface 40 which mates with the outer surface 17 of the nut 15 adjacent end disc 21 when said sleeve S is fitted into the opening. Sleeve S has a lateral opening 41 which is aligned with a selected portion of outer helical guideway 19 for loading said bearing members by simply pushing and rotating (as necessary) the enclosing member 11 along the nut 15 (to the left in FIG. 2) while the sleeve S is mated therewith. Bearing members are dropped through said opening 41 into guideway 19 and may be transferred to the guideway 18 until the entire assembly is loaded. The sleeve S will hold the bearing members of the second set (in outer guideway 19) in place until the nut 15 and end disc 21 are inserted into cavity 22 by shifting the enclosing member 11 back to the right. Once the nut and end discs are inserted into cavity 22, the sleeve S is removed and ring member 14 is replaced over open end 23 to lock the assembly. Thus, sleeve S in combination with member 11 and pins 24 and 25, enhances the easy assembly and disassembly features of this invention.

In operation, bearing members 20 of the first set, are held captive by the groove 13 and inner guideway 18 forming the operative thread of the mechanism. Assuming clockwise rotation of the screw 12, the members 20 one by one follow groove 13 and intersect ramp 30 of the end disc 21' whereby said members 20 are transferred into the outer or return helical guideway 19 on the circumferential surface 17 of the nut 15. The transfer occurs smoothly as above described. The members 20' in the return guideway 19 may intersect the end disc 21 positioned at the opposite end of nut 15. The end disc transfers the members 21' at this end into said helical groove 18. When the screw is rotated in the opposite direction the balls move in the opposite direction.

Therefore, in summary of the salient features of the invention, a durable, compact, ball-screw mechanism 10 is disclosed which is easily machined and assembled. Said ball-screw mechanism comprises a tubular nut 15 encased between an outer removable enclosing member 11 surrounding said nut and a screw member 12. A helical groove or thread 13 on said screw cooperates with a helical guideway 18 on the inner surface of said nut to support a first set of the bearing members 20. The nut 15 has a return helical guideway 19 on the outer circumferential surface of said nut. The bearing members maintain a driving relationship between said nut 15 and said screw 12. Bearing members 20 are transferred between helical guideway 18 and return helical guideway 19 (second set) by means of end transfer discs 21 positioned at each end of nut 15. Said transfer discs have an open grooved ramp 30, said ramp 30 spiraling from cooperative adjacency with guideway 18 to guideway 19. A sleeve member S may be used to load the bearing members into the helical guideway 19.

In this disclosure, there is shown and described only the preferred embodiment of the invention, but, as aforementioned, it is to be understood that the invention is capable of use in various other combinations and environment and is capable of changes or modifications within the scope of the inventive concept as expressed herein.

I claim:

1. A ball-screw mechanism comprising a screw member having a helical groove, a tubular nut having inner and outer circumferential faces, one of the faces having a first open helical guideway formed therein in opposed relationship to said groove, a first set of bearing members held captive between said groove and said guideway to establish the relative driving relationship between said screw and said nut, a second open guideway formed in the other face of said nut and in the return direction, a second set of bearing members in said return direction guideway, a removable enclosing member contiguous with said other face and in engagement with said second set of bearing members to hold the same captive, separate transfer discs at each end of said nut, each disc having an open grooved ramp spiraling from cooperative adjacency with said first guideway to said second guideway to transfer said bearing members between said first and second sets, whereby the parts are easily machined with open grooves and the assembly thereof is compact.

2. The ball-screw mechanism of claim 1 wherein said second guideway is helical with substantially the same pitch as said first guideway whereby the resistance to movement of said bearing members along the entire path is minimized.

3. The ball-screw mechanism of claim 1 wherein said second guideway is substantially the same depth as the cross section dimension of said bearing member, whereby said enclosing member is ungrooved for ease of assembly.

4. The ball-screw mechanism of claim 1 wherein said tubular nut and end discs are mounted within a cavity in said enclosing member, and ring means at the open end of said cavity to hold said nut and discs together and in said cavity.

5. The ball-screw mechanism of claim 4 wherein is provided a loading sleeve for said bearing members, said sleeve fitting into said open end of said cavity and the inner surface mating with said other face of said nut and the adjacent disc, and a lateral opening in said sleeve for alignment with any selected portion of said second guideway for loading said bearing members, said sleeve holding said bearing members in place until the nut and end disc assembly is pushed into place in said cavity.

6. The ball-screw mechanism of claim 1 wherein said end discs are affixed to said nut to form an assembly by pin means fitting into aligned holes by a tight friction fit.

7. The ball-screw mechanism of claim 6 wherein one of said pin means is received in a locating aperture in said enclosing member to prevent movement of said assembly.

8. The ball-screw mechanism of claim 1 wherein said spiral ramp extends through 360°, the depth of said ramp gradually varying from minimum to maximum and back to minimum.

9. The ball-screw mechanism of claim 8 wherein the ramp includes a central maximum depth portion extending through approximately 45°.

10. The ball-screw mechanism of claim 8 wherein the remainder of the 360° of the ramp is divided into radially inner and outer portions, the inner portion extending through approximately 180° and the outer portion through approximately b 135°.

* * * * *

UNITED STATES PATENT OFFICE
CERTIFICATE OF CORRECTION

PATENT NO. : 3,826,153
DATED : July 30, 1974
INVENTOR(S) : Richard H. Sheppard

It is certified that error appears in the above-identified patent and that said Letters Patent are hereby corrected as shown below:

Column 1, line 63, change "braod" to --broad--.

Column 5, line 65, change "20°" to --20'--.

Claim 10, line 5, after "approximately", delete "b".

Signed and Sealed this twenty-seventh Day of April 1976

[SEAL]

Attest:

RUTH C. MASON
Attesting Officer

C. MARSHALL DANN
Commissioner of Patents and Trademarks